United States Patent Office 2,970,154
Patented Jan. 31, 1961

2,970,154
AMINO DERIVATIVE

Lincoln Harvey Werner, Summit, and George de Stevens, New Providence, N.J., assignors to Ciba Pharmaceutical Products, Inc., Summit, N.J., a corporation of New Jersey No Drawing. Filed Jan. 14, 1959, Ser. No. 786,687

3 Claims. (Cl. 260—397.7)

The present invention relates to aniline derivatives, the 2,4-di-(N-ethyl-sulfamyl) - 5 - halogeno - anilines, in which halogen represents bromine, or particularly chlorine, and the salts with alkali metals, e.g. sodium or potassium thereof.

These compounds have been found to show diuretic and natriuretic effects coupled with an antihypertensive activity, which makes the compounds of this invention highly useful as diuretic and natriuretic compounds, particularly in the treatment of salt and water retention connected with heart or kidney diseases. Particularly useful as a diuretic and natriuretic compound with antihypertensive effects is the 5-chloro-2,4-di-(N-ethyl-sulfamyl)-aniline of the formula:

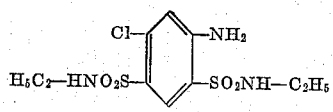

The new compounds of this invention may be used as medicaments in the form of pharmaceutical preparations, which contain the new aniline derivatives or the salts thereof in admixture with a pharmaceutical organic or inorganic, solid or liquid carrier suitable for enteral, e.g. oral, or parenteral administration. For making up the preparations there can be employed substances which do not react with the new compounds, such as water, gelatine, lactose, starches, stearic acid, magnesium stearate, stearyl alcohol, talc, vegetable oils, benzyl alcohols, gums, waxes, propyleneglycol, polyalkylene glycols or any other known carrier for medicaments. The pharmaceutical preparations may be in solid form, for example, as capsules, tablets or dragees, or in liquid form, for example, as solutions, e.g. isotonic saline solutions, or as suspensions or emulsions. If desired, they may contain auxiliary substances such as preserving agents, stabilizing agents, wetting or emulsifying agents, salts for varying the osmotic pressure or buffers. They may also contain, in combination, other therapeutically useful substances.

The aniline compounds of this invention may be prepared according to standard methods. For example, a 5-halogeno-aniline-2,4-disulfonyl halide, particularly a 5-halogeno-aniline-2,4-disulfonyl chloride, may be treated with ethylamine, and, if desired, a resulting salt may be converted into the free compound, and/or, if desired, a free compound may be converted into a salt thereof.

The reaction with the ethylamine is performed in solution, for example, by adding the starting material to ethylamine, preferably in solution, for example, in water, in a water miscible solvent, such as a lower alkanol, e.g. methanol or ethanol, in an aqueous mixture of such solvent, or in a sparingly water-soluble solvent, such as a halogeno-lower alkane, e.g. chloroform, or in an aromatic hydrocarbon, e.g. benzene or toluene. If necessary, the reaction may be completed at an elevated temperature, and/or the atmosphere of an inert gas, e.g. nitrogen.

The compounds may also be prepared by treating a 2,4-disulfamyl-5-halogeno-aniline or an alkali metal, e.g. sodium or potassium salt thereof with a reactive ester of ethanol, and, if desired, carrying out the optional steps.

Generally, an alkali metal salt of the starting material is formed and such salt is then reacted with the reactive ester of ethanol. Such reactive esters are particularly those with strong mineral acids, such as hydrohalic acids, e.g. hydrochloric, hydrobromic or hydriodic acid, or sulfuric acid. For example, treatment of the starting material with diethyl sulfate in the presence of an alkaline reagent, such as, an alkali metal hydroxide, e.g. lithium, sodium or potassium hydroxide, is a preferred procedure. As solvents water or water miscible organic solvents, such as lower alkanols, e.g. methanol, ethanol, propanol, isopropanol or tertiary butanol; ethers, such as diethyleneglycol dimethylether, or formamides, e.g. dimethylformamide, may be used.

Or, an alkali metal, e.g. lithium, sodium or potassium, salt of the starting material, prepared by treating the latter with an alkali metal, e.g. lithium, sodium or potassium, hydride, amide, hydroxide or lower alkanolate, e.g. methanolate or ethanolate, is reacted with an ethyl halide, e.g. ethyl chloride, bromide or iodide. About stoichiometric amounts of the reactants or a slight excess of the lower alkyl halide are used; solvents are primarily those previously mentioned and are chosen in accordance with their inertness towards the reactants and the solubility of the latter.

Generally, the ethylation reaction may be carried out under cooling, at room temperature or at an elevated temperature, particularly, if a lower alkyl halide is used as the alkylating reagent. If necessary, it is performed in a closed vessel, e.g. in a sealed tube, under pressure and/or in the atmosphere of an inert gas, e.g. nitrogen.

The resulting product may be obtained in the form of the free compound or as a salt thereof. An alkali metal salt may be converted into the free compound by treatment with an aqueous acidic reagent, such as a mineral acid, for example, hydrohalic acid, e.g. hydrochloric acid, or sulfuric acid. A free compound may be converted into an alkali metal salt, for example, by treatment with an alkali metal hydroxide, e.g. sodium or potassium hydroxide, in a solvent, such as in a lower alkanol, e.g. methanol or ethanol, or in water and evaporating the solvent; or by reacting the free compound, for example, in an ether, e.g. diethyleneglycol dimethylether, solution, with an alkali metal hydride or amide, e.g. sodium or potassium hydride or amide, and removing the solvent. Mono- or polysalts may be obtained.

The following example illustrates the invention; it is not to be construed as being a limitation thereon. Temperatures are given in degrees centigrade.

Example

A total of 9 g. of 5-chloro-aniline-2,4-disulfonyl chloride is added portionwise to 30 ml. of a 50% aqueous solution of ethylamine at room temperature; the mixture is allowed to stand for 30 minutes and is then heated on the steam bath for 15 minutes. The crystalline material is filtered off and recrystallized from aqueous ethanol (1:1) to yield the 5-chloro-2,4-di-(N-ethyl-sulfamyl)-aniline M.P. 196–198°; yield: 6.6 g.

The same compound may also be obtained as follows: A solution of 14.5 g. of 5-chloro-2,4-disulfamyl-aniline in 110 ml. of 1 N aqueous sodium hydroxide and 200 ml. of water is cooled to 10° and treated with a total of 16 g. of diethyl sulfate, which is added dropwise over a period of 15 minutes. Stirring is continued for one hour at 10–15° and for four hours at room temperature. After standing overnight the precipitate is filtered off, crystallized by adding water to an ethanol solution thereof and recrystallized from a 1:1-mixture of ethanol and water. The resulting 5-chloro-2,4-di-(N-ethyl-sulfamyl)-aniline is identical with the product obtained according to the previously described procedure.

By using 5-bromo-aniline-2,4-disulfonyl chloride or 5-bromo-2,4-disulfamyl-aniline, respectively, as the starting materials in the above procedures the 5-bromo-2,4-di-(N-ethylsulfamyl)-aniline is obtained.

What is claimed is:
1. A member of the group consisting of 2,4-di-(N-ethylsulfamyl)-5-halogeno-aniline, and alkali metal salts thereof.
2. 5-chloro-2,4-di-(N-ethyl-sulfamyl)-aniline.
3. 5-bromo-2,4-di-(N-ethyl-sulfamyl)-aniline.

References Cited in the file of this patent
UNITED STATES PATENTS

| | | |
|---|---|---|
| 2,804,454 | Beffa et al. | Aug. 27, 1957 |
| 2,809,194 | Novello | Oct. 8, 1957 |
| 2,826,594 | Dreisbach | Mar. 11, 1958 |